United States Patent
Sauve

(10) Patent No.: US 7,159,681 B1
(45) Date of Patent: *Jan. 9, 2007

(54) PERSONAL TRANSPORTER

(76) Inventor: Dennis N. Sauve, 8051 N. Tamiami Trail, Sarasota, FL (US) 34243

( * ) Notice: Subject to any disclaimer, the term of this patent is extended or adjusted under 35 U.S.C. 154(b) by 0 days.

This patent is subject to a terminal disclaimer.

(21) Appl. No.: 11/052,624

(22) Filed: Feb. 7, 2005

Related U.S. Application Data

(63) Continuation-in-part of application No. 10/659,873, filed on Sep. 12, 2003, now Pat. No. 6,851,498.

(51) Int. Cl.
*B62D 61/00* (2006.01)

(52) U.S. Cl. ................ 180/208; 180/65.1; 180/639

(58) Field of Classification Search ............. 180/208, 180/65.1, 214; 280/639, 641, 651, 87.041, 280/87.042, 781, 782, 87.05
See application file for complete search history.

(56) References Cited

U.S. PATENT DOCUMENTS

| | | | | |
|---|---|---|---|---|
| 3,004,619 | A * | 10/1961 | Straussler | 180/208 |
| 3,079,172 | A * | 2/1963 | Burwell | 180/208 |
| 3,249,171 | A * | 5/1966 | Kinghorn | 180/208 |
| 3,329,228 | A * | 7/1967 | Harris | 180/208 |
| 3,369,629 | A * | 2/1968 | Weiss | 180/208 |
| 3,417,834 | A * | 12/1968 | Smith | 180/208 |
| 3,580,348 | A * | 5/1971 | Di Blasi | 180/208 |
| 3,770,289 | A * | 11/1973 | Dougherty et al. | 280/639 |
| 5,695,021 | A * | 12/1997 | Schaffner et al. | 180/208 |
| 6,012,539 | A * | 1/2000 | Patmont | 280/87.041 |
| 6,273,206 | B1 * | 8/2001 | Bussinger | 180/208 |
| 6,717,524 | B1 | 4/2004 | DeLine et al. | |
| 6,756,912 | B1 | 6/2004 | Skiver et al. | |
| 6,774,356 | B1 | 8/2004 | Heslin et al. | |
| 6,774,810 | B1 | 8/2004 | DeLine et al. | |
| 6,832,719 | B1 | 12/2004 | DeVries et al. | |
| 6,851,498 | B1 * | 2/2005 | Sauve | 180/208 |
| 2003/0020603 | A1 | 1/2003 | DeLine et al. | |
| 2003/0191583 | A1 | 10/2003 | Uhlmann et al. | |
| 2004/0021956 | A1 | 2/2004 | Bos | |
| 2004/0094692 | A1 | 5/2004 | Schofield et al. | |
| 2004/0240090 | A1 | 12/2004 | Skiver et al. | |
| 2005/0007256 | A1 | 1/2005 | DeLine et al. | |

OTHER PUBLICATIONS

Commonly assigned co-pending U.S. Appl. No. 10/793,500, filed Mar. 4, 2004, entitled Vehicle System for a Vehicle (DON01 p. 1141).

* cited by examiner

*Primary Examiner*—Hau Phan
(74) *Attorney, Agent, or Firm*—William Nitkin

(57) ABSTRACT

A four-wheel personal transporter having a collapsible shell and a seat mounted on at least one shaft disposed at the rear end of the device, such shaft(s) movable approximately 90 degrees rearward from an upright position to a storage position and maneuvered into a receipt slot defined in the top portion of the rear shell, and a steering column disposed at the front end of the personal transporter in an upright position for use and rotatable approximately 90 degrees downward to a storage position against the top of the shell when such shell is in its collapsed storage mode, such steering column having a handle usable to pull the device on its front wheels in its storage mode.

5 Claims, 3 Drawing Sheets

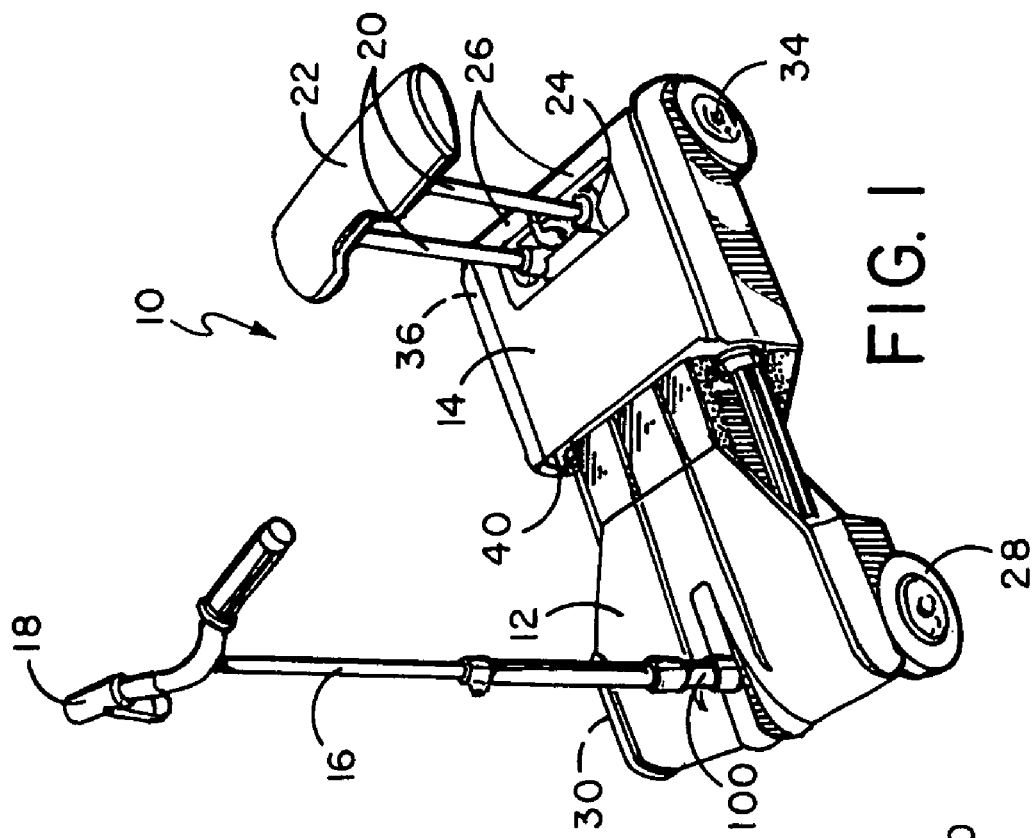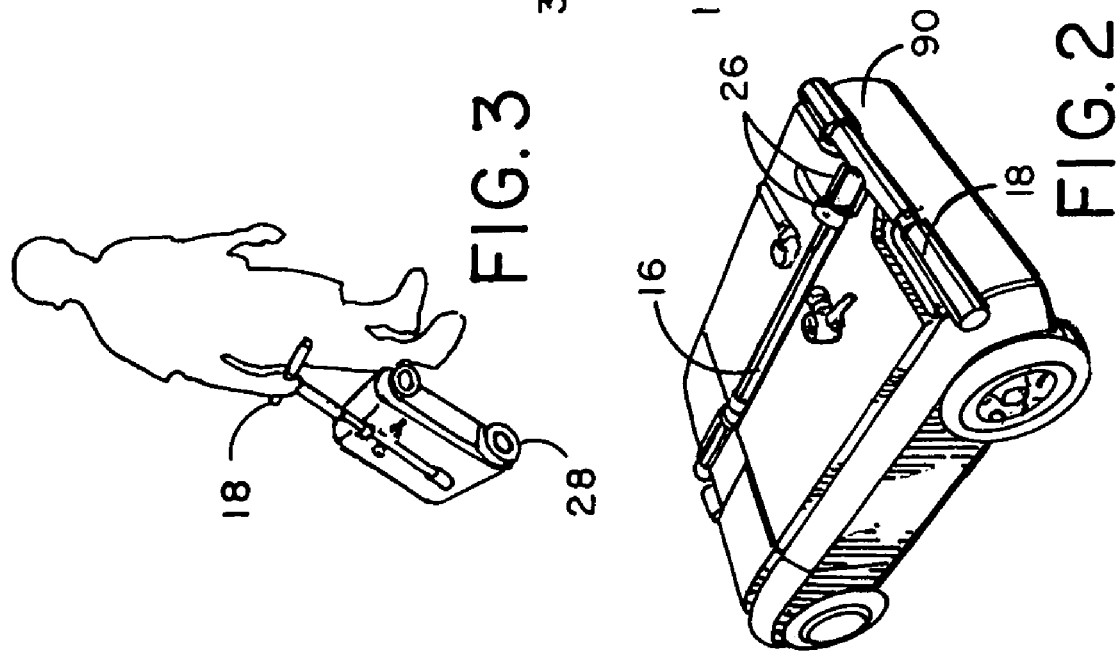

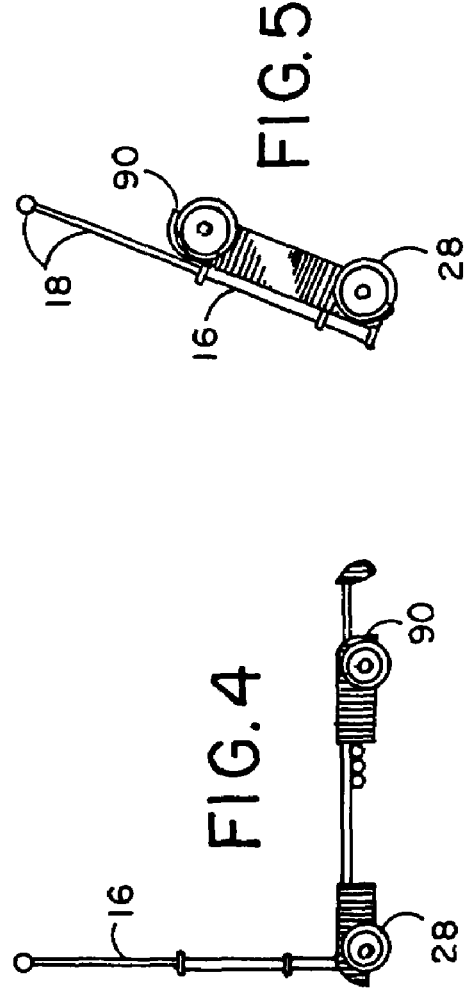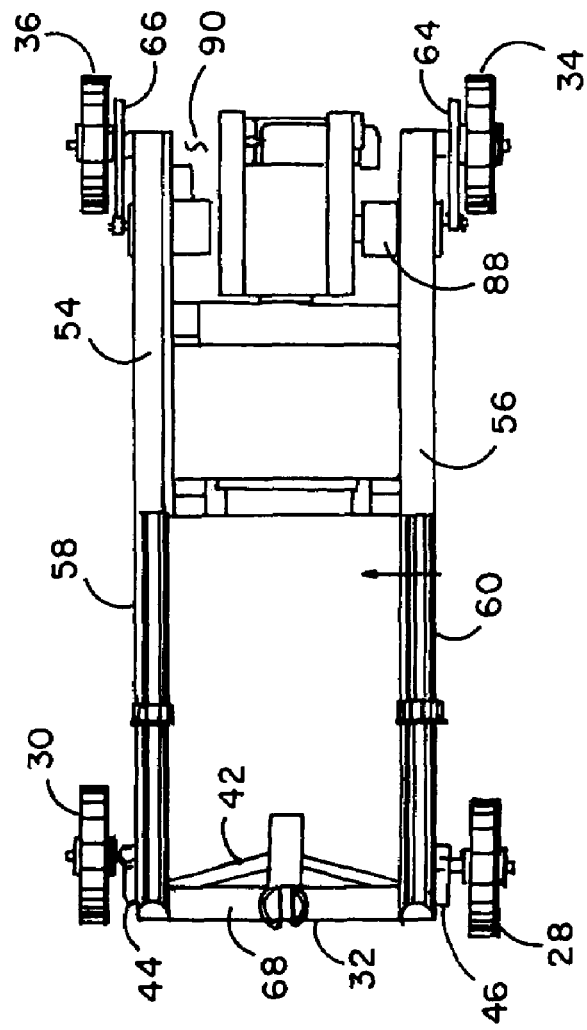

PERSONAL TRANSPORTER

This application is a continuation-in-part of my previous application entitled Lightweight Compact Collapsible Folding Personal Transporter, Ser. No. 10/659,873 filed Sep. 12, 2003, now U.S. Pat. No. 6,851,498.

BACKGROUND OF THE INVENTION

1. Field of the Invention

The structure of this invention resides in the area of motor vehicles and more particularly relates to a lightweight collapsible folding four-wheel personal transporter or scooter which in a storage mode is easy to fold, pull and/or carry and in a use mode is easy and convenient to set up for transporting an individual as desired.

2. History of the Prior Art

Motor scooters, particularly four-wheel scooters having a seat and a steering handle, are well known such as the CITY BUG scooter manufactured for EV Rider of Sarasota, Fla. Such scooters, though, are not especially compact and lightweight so that they cannot be easily transported and/or stored when not in use.

SUMMARY OF THE INVENTION

It is an object of this invention to provide an improved four-wheel folding electric personal transporter or scooter which utilizes a retractable, collapsible rail frame and a rotating integral front steering assembly which rotates from an upright position to a storage position on the top of the collapsed scooter and a seat post and attached seat which can be removed or can be rotated from an upright use position to a folded position and maneuvered into a recess formed within the rear of the main housing such that the scooter, when folded for storage, is so compact that it is similar in size to a large briefcase and can even be carried as "carry on" luggage on an airplane. The steering assembly can be used as a pull handle with the front wheels resting and freely rotating on the ground so that the device can be pulled by a user while walking. The front steering column with steering handle and steering mechanism is mounted so that after pulling up a collar ring lock, the steering column rotates approximately 90 degrees from an upright use position down onto the top of the main housing for storage. Other equivalent locking mechanisms can be used, such as a twist nut or lock. The device utilizes the improved lightweight batteries and motors of the current technology which use provides savings in size and weight over scooters having conventional drive systems and traditional motor transmissions. The location of the motor(s) in the scooter of this invention is near the rear wheels, and the battery is located within the main housing of the structure. It should be noted that the motor location can vary, and in some embodiments the motor can even be in a wheel. The battery can incorporate modern nickel metal hydride or lithium ion technology. The unit can weigh approximately 30 lb. and carry an individual weighing upwards of 300 lb. In a folded storage mode the unit is approximately 22 inches long, 7 inches high and 19 inches wide; and in an unfolded use mode the unit is approximately 37 inches long, 30 inches high when the seat and steering handle are erected, and 19 inches wide. The collapsible main housing and overlapping shells allow for the lateral adjustment of the wheel base to extend from an extended state of approximately 30 inches to a collapsed state of approximately 16 inches.

BRIEF DESCRIPTION OF THE DRAWINGS

FIG. 1 illustrates a perspective view of the personal transporter of this invention in its use mode with the seat and steering column erected.

FIG. 2 illustrates a perspective view of the device of FIG. 1 in its storage mode, showing the steering column rotated downward approximately 90 degrees from its upright position onto the top of the main housing and the seat collapsed.

FIG. 3 illustrates a perspective view of the device of this invention showing the device in its storage mode with steering handle extended to act as a pull handle and showing a figure pulling the device by its pull handle.

FIG. 4 illustrates a side view of the device of this invention in an extended position with the steering handle upright and with the seat moved down.

FIG. 5 illustrates a side view of the device of this invention in its collapsed storage position with its steering handle extended for pulling.

FIG. 6 illustrates a top view of the interior frame of the device of this invention.

DESCRIPTION OF THE PREFERRED EMBODIMENT(S)

Figure 7:
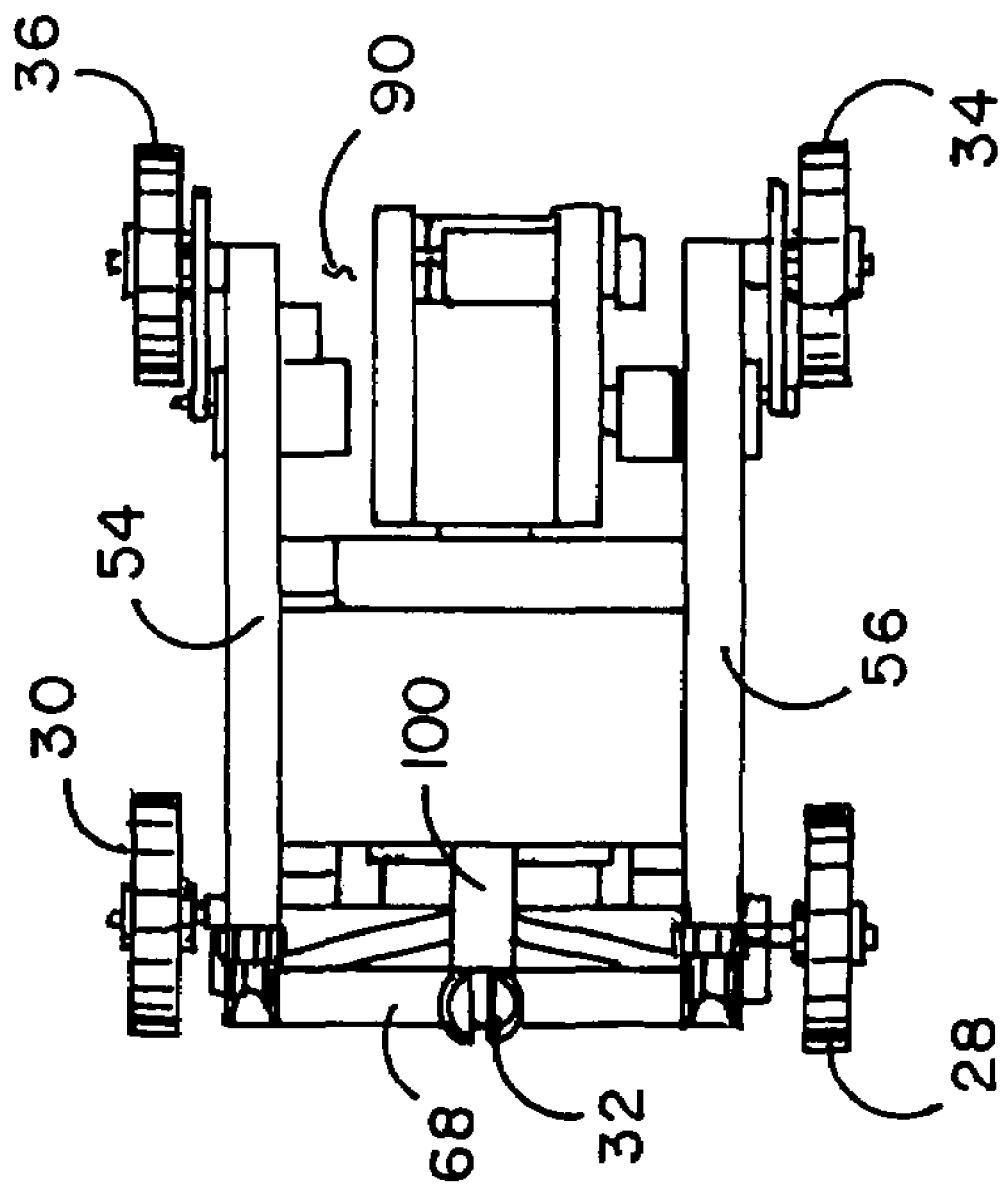
FIG. 7 illustrates a top view of the invention as shown in FIG. 6 in a collapsed position.

FIG. 1 illustrates a perspective view of the personal transporter 10 of this invention. Personal transporter or scooter 10 has four wheels, being first front wheel 28, second front wheel 30, first rear wheel 34 and second rear wheel 36 which are held onto a framework as described in more detail below. In FIG. 1 one can see front shell 12 of the main housing, a portion of which can be moved into rear shell 14 when the front and rear shells are collapsed together such that a portion of front shell 12 moves into front shell receipt area 40 defined in a portion of rear shell 14, allowing the scooter to be collapsed. As seen in FIG. 1, steering column 16 is shown in its upright position such that by rotating steering handle 18, the steering movement of first and second front wheels 28 and 30 can be achieved. To operate the scooter, one sits on seat 22 mounted on seat shafts 20 and can activate controls for acceleration and braking, which controls can be positioned in any desired location on the structure, such as on steering handle 18. In use one sits on seat 22 and rotates steering handle 18 to steer the scooter while it is moving.

When one is finished using the scooter and wishes to place it into its storage and transport mode, one first moves seat 22 on seat shaft hinge 24 such that seat shafts 20 passes into seat shaft receipt slots 26 formed in the top of rear shell 14 for storage. When seat 22 is in its lowered position, it is pushed inward into seat receipt area 90 defined in rear shell 14 for storage. One then pushes the front of the device to the rear such that front shell 12 moves into front shell receipt area 40 of rear shell 14, thus substantially reducing the size of the unit by moving first and second front wheels 28 and 30 much closer to first and second rear wheels 34 and 36. One then rotates steering column 16 downward 90 degrees to its position on the top of the scooter, as described further below, as seen in FIG. 2, being released from engagement with steering shaft 68, not seen in this illustration, by lifting collar 100. One then grasps steering handle 18 to extend steering column 16 to pull the scooter on its freely rotatable first and second front wheels 28 and 30, as shown in FIG. 3.

FIG. 6 illustrates the framework of the interior of the scooter with the front and rear shells removed for purposes of illustration, showing first frame rail 54 and second frame rail 56 which can telescopically receive, respectively, therein first frame rail extension 60 and second frame rail extension 58 in a fashion such that first and second frame rail extensions 60 and 58 can be maneuvered inward and outward to collapse or extend the frame rail extensions within the first and second frame rails. First and second rear wheels 34 and 36 are mounted, respectively, on first rear wheel suspension member 64 and second rear wheel suspension member 66. A motor can be placed near one or both rear wheels, such as first motor 88 seen near first rear wheel 34 and second motor 89 seen near second rear wheel 36. The motors can drive the wheels by drive belts. Battery technology is well known, and a battery is not illustrated herein but is understood to be placed within the body of the structure of this invention and to be interconnected by wires, not shown but also well known, to drive, for example, first motor 88 near first rear wheel 34. Not seen in FIG. 6 is steering column 16 which is rotatably mounted on steering shaft 68, fitting in collar 100, as seen in FIGS. 1 and 7. On the first and second ends of steering shaft 68 are rotatably mounted first front wheel 28 and second front wheel 30. Tie rod 42 connects first spindle 46 to second spindle 44 to effect the steering movement of the front wheels, as described further below. Steering column 16 can be rotated on steering shaft hinge 32, as seen respectively in FIGS. 2 and 6, so that it comes to rest on the top of the collapsed structure. Lastly, when placing the scooter of this invention into its storage mode, seat shaft 20 and seat 22 are rotated rearward and downward, as seen in FIG. 4, and seat 22 is then moved to a collapsed position where seat shafts 20 fit within seat shaft receipt slots 26, as seen in FIG. 2, and seat 22 fits within seat receipt area 90 defined in the rear of the main housing, as seen in FIGS. 2 and 5.

FIG. 7 illustrates a top view of the device as shown in FIG. 6 in a collapsed position with first and second frame rail extensions 60 and 58 maneuvered, respectively, into first and second frame rails 56 and 54. The frame rails can be tubular, rectangular or of other cross-sectional shape, and embodiments can include a single frame rail design.

Although the present invention has been described with reference to particular embodiments, it will be apparent to those skilled in the art that variations and modifications can be substituted therefor without departing from the principles and spirit of the invention.

I claim:

1. A personal transporter having a front end, a rear end, two wheels disposed at said front end, two wheels disposed at said rear end, and a steering mechanism, said steering mechanism disposed at said front end, comprising:

a collapsible frame, said frame being extended in its use mode and collapsed in its storage mode;

a shell disposed over said frame, said shell comprised of a front shell and a rear shell, said front and rear shells each having a top portion and one having a section adapted to fit within the other such that said shell can be collapsed along with said collapsible frame;

a steering column disposed at said front end of said personal transporter mounted in an upright position in a first use position for steering said personal transporter and in a second storage mode rotatable downward approximately 90 degrees rearward to a storage position on top of said shell;

at least one seat shaft having a top, said seat shaft mounted at said rear end of said personal transporter;

a seat mounted on said top of said seat shaft(s), said seat shaft(s) hinged to move approximately 90 degrees rearward from an upright use position to a horizontal storage position when said shell is in its collapsed storage mode;

at least one motor disposed inside said shell for driving at least one wheel of said personal transporter; and at least one battery positioned inside said shell for providing power to said motor(s).

2. The personal transporter of claim 1 further including a seat shaft receipt slot defined in said rear portion of said rear shell for receiving said seat shaft when said personal transporter is in its storage mode.

3. The personal transporter of claim 2 further including a raisable and lockable collar disposed around said steering column, said steering column when in its upright position engaging and controlling said steering mechanism of said personal transporter; and said steering column, when said collar is raised, movable from its upright use position to its storage mode.

4. The personal transporter of claim 3 wherein said collapsible frame is comprised of telescoping members.

5. The personal transporter of claim 1 wherein said shell further includes a seat receipt area defined therein for receipt of said seat when said personal transporter is in its storage mode.

* * * * *